United States Patent [19]

Raychaudhuri et al.

[11] Patent Number: 4,536,846
[45] Date of Patent: Aug. 20, 1985

[54] DISTORTION REDUCER FOR COMPANDED ANALOG SYSTEMS

[75] Inventors: Dipankar Raychaudhuri, Kendall Park; Leonard N. Schiff, Lawrenceville, both of N.J.

[73] Assignee: RCA Corporation, Princeton, N.J.

[21] Appl. No.: 420,506

[22] Filed: Sep. 20, 1982

[51] Int. Cl.³ .............................................. H04B 1/64
[52] U.S. Cl. ........................................ 364/514; 333/14
[58] Field of Search .......................... 364/514; 333/14; 328/163

[56] References Cited

U.S. PATENT DOCUMENTS

| | | | |
|---|---|---|---|
| 3,559,068 | 1/1971 | Almering et al. | |
| 3,602,818 | 8/1971 | Anderlecht et al. | 333/14 X |
| 3,873,945 | 3/1975 | Muraoka | 333/14 |
| 3,973,199 | 8/1976 | Widmer | 332/110 X |
| 3,978,409 | 8/1976 | Dolby et al. | 333/14 X |
| 4,109,212 | 8/1978 | Donnell et al. | 333/14 X |
| 4,162,462 | 7/1979 | Endoh et al. | 333/14 |
| 4,187,477 | 2/1980 | Endoh et al. | 333/14 |
| 4,200,889 | 4/1980 | Strobele | 333/14 X |
| 4,250,470 | 2/1981 | Szarvas | 333/14 |
| 4,376,916 | 3/1983 | Glaberson | 333/14 X |

Primary Examiner—Edward J. Wise
Attorney, Agent, or Firm—J. S. Tripoli; R. L. Troike; W. H. Meise

[57] ABSTRACT

An improved companded transmission system uses a transmitter having a first compressor for compressing a signal m(t) of bandwidth $B_1$ to form a signal $C[m(t)]$. The transmission system has a bandwidth $B_2$ where $B_1 \geq B_2$. A receiver having an expander to expand the received signal r(t) is provided to produce a signal $m_E(t)$. The improvement consists of a circuit for recovering the frequency components $f_L$ lost during transmission of $C[m(t)]$ and includes a second compressor for compressing $m_E(t)$ in the same manner as m(t) was compressed to produce a signal $C[m_E(t)]$ which contains frequency components $f_c$ lying above $B_2$. A filter which is responsive to $C[m_E(t)]$ generates $(C[m_E(t)] - f_c)$, and, a subtractor subtracts $(C[m_E(t)] - f_c)$ from $C[m_E(t)]$. An adder adds $f_c$ to r(t), and, an expander expands the summed signal $f_c + r(t)$ to produce a signal $m_1(t)$ which is a first order corrected approximation of m(t). Similar structure can iteratively process $m_1(t)$ to further refine or correct the received signal.

5 Claims, 3 Drawing Figures

DISTORTION REDUCER FOR COMPANDED ANALOG SYSTEMS

This invention relates generally to companding systems for analog systems and more particularly, to a companding system and method which reinserts frequencies normally lost in other companding arrangements.

While the present invention can be employed in various types of analog communication systems it will be described in connection with a television transmission system as a vehicle for such description. In a television signal the human eye is more sensitive to noise in the gray area than in either the black or white portions of the picture even though the signal-to-noise (S/N) ratio may be the same in all three brightness areas. To compensate for the foregoing, the TV signal is passed through a non-linear amplifier (called a compressor) which provides high gain in the gray region and low gain in the white and black regions. When the signal is passed through the inverse non-linear amplifier (called an expander), the result is that the gray signals have a higher S/N than black or white. The net effect of this is an overall improvement in the subjective quality of the television image.

However, in the process of compressing at the transmitter and then expanding at the receiver high frequency components are introduced into the signal during compression at the transmitter which are then lost during the transmission thereof because they lie outside the bandwidth of the transmission path (channels). Such signals represent a part of the intelligence of the transmitted signal but are not recovered in the expanding process at the receiver by prior art methods.

Signals other than television signals are also often compressed at the transmitter and then expanded at the receiver and experience a similar loss of portions of the signal during transmission because of the creation of high frequency components due to the compression.

It has been shown theoretically that such lost portions of the signal can be recovered at the receiver by an iterative scheme which generally requires several complex processing steps involving a fairly sophisticated data processor. Reference is made to a paper by H. J. Landau entitled "On the Recovery of a Band Limited Signal After Instantaneous Companding and Subsequent Band Limiting" appearing on pages 351–364 of the March, 1960 issue of the Bell System Technical Journal and in another article by H. J. Landau and W. L. Miranker entitled "The Recovery of Distorted Band-limited Signal" appearing on pages 97–104 of the 1961 issue of the Journal of Mathematical Analysis and Application.

While the method described in the foregoing papers can result in an almost 100% recovery of the lost intelligence the structure required to implement the theory in the papers involves a rather complex data processing system including an extensive program with many iterative steps resulting in a relatively long period of time for the recovery of the lost signal portion. Such a long period of time usually means that the received signal must be stored while the processing thereof is occurring, thus make a real time system unrealizable in such cases.

In accordance with a preferred form of the invention there is provided, in a companded transmission system comprising a transmitter having a compressor for compressing a signal $m(t)$ of bandwidth $B_1$ into a signal $C[m(t)]$, a transmission system having a bandwidth $B_2$, where $B_1 \leq B_2$, and a receiver having an expander for expanding the received signal $r(t)$ to produce a signal $m_E(t)$, a circuit for recovering the frequency components $f_L$ lost during transmission of $C[m(t)]$ and comprising a compressor for compressing $m_E(t)$ in the same manner $m(t)$ was compressed at the receiver to produce a signal $C[m_E(t)]$ which contains frequency components $f_c$ lying above $B_2$ a logic arrangement responsive to $C[m_E(t)]$ for generating $f_c$ an adder for adding $f_c$ to $r(t)$, an expander for expanding the summed signal $f_c+r(t)$ to produce $m_1(t)$, which is a first order corrected approximation of $m(t)$.

In the drawings:

FIG. 3 is a curve showing the relative times of the prior art and the present invention required to recover the lost portion of the signal at the receiver.

It should be noted at the outset of this specification that while the compression function is described herein as occurring at the transmitter and the expansion function as occurring at the receiver, the reverse is also meant to be within the scope of the claimed invention, e.g., with the expansion occurring at the transmitter and the compression at the receiver. In fact, in terminology currently used in the art, the term "compression" is normally employed to describe the function occurring at the transmitter and can mean either "compression" or "expansion" or a combination of both. Similarly, the term "expansion" normally applies to the function at the receiver and can mean "expansion" or "compression", or both. Both terms imply a non-linear transformation of the signal.

Figure 1:
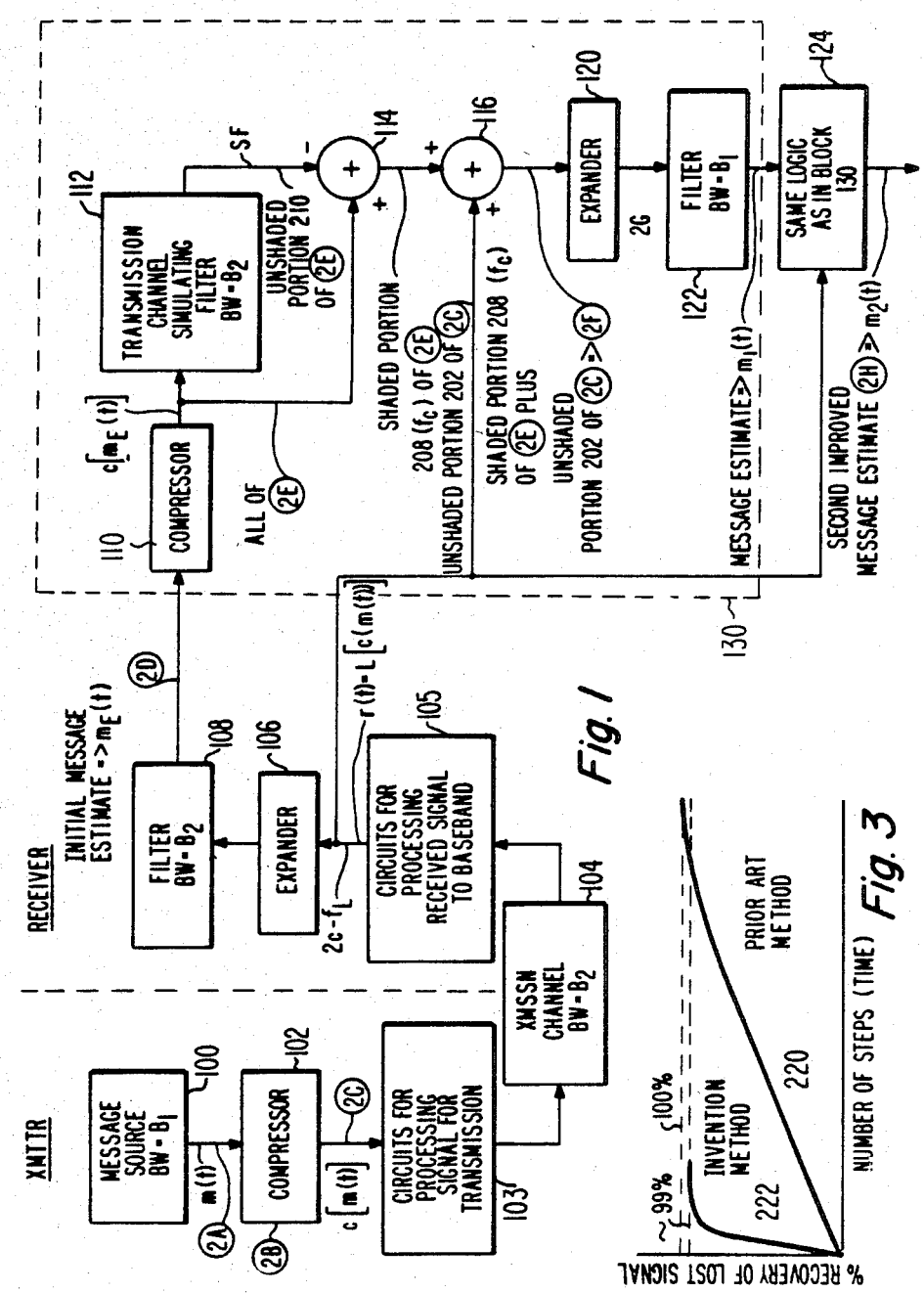
FIG. 1 is a combined block and logic diagram of one embodiment of the invention.
Figure 2:
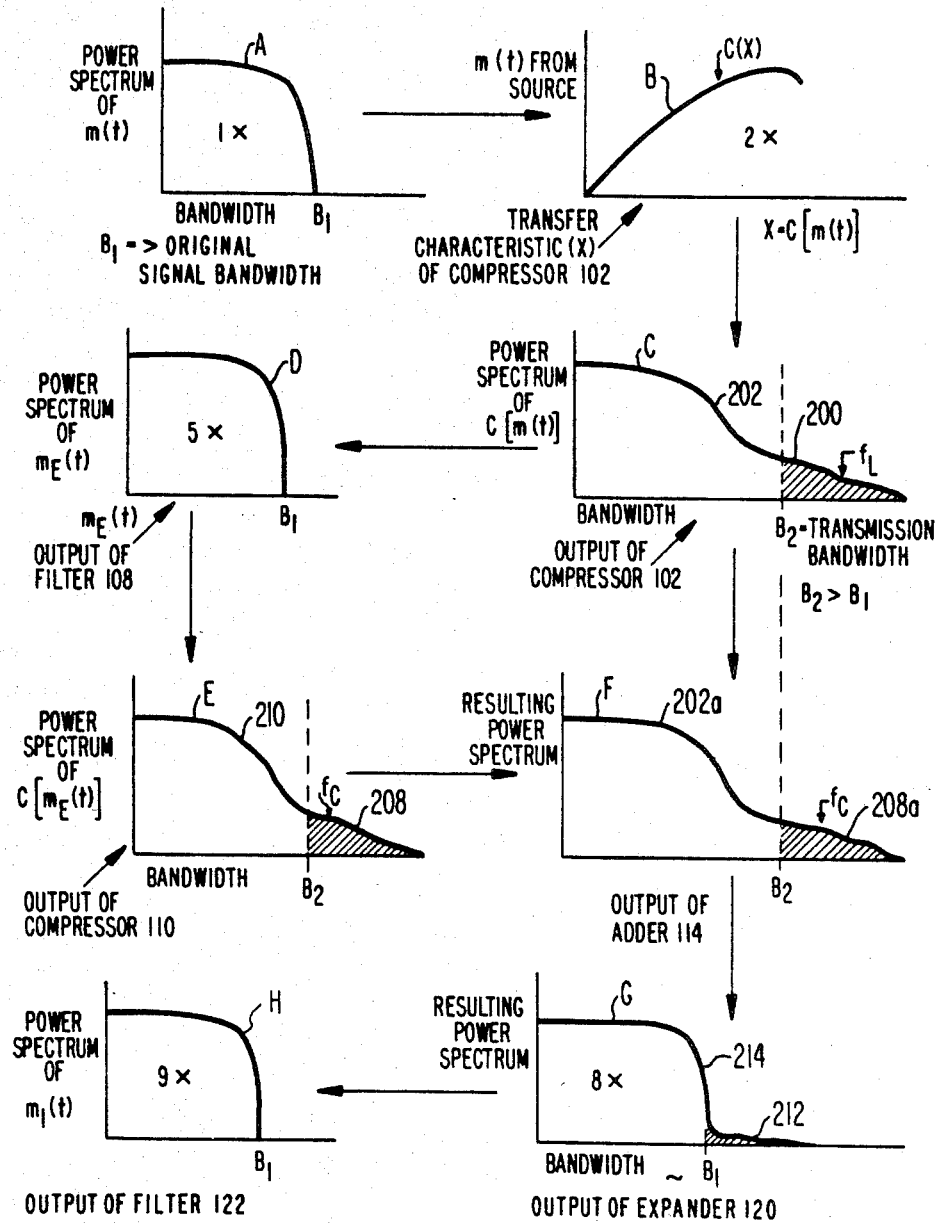
FIG. 2 is a set of eight curves including one transfer function showing the signal being processed at various points in the diagram of FIG. 1.

Also, for purposes of brevity the various curves of FIG. 2 will be referred to herein as waveform or curve 2A or curve 2B etc. rather than as waveform or curve A of FIG. 2 or curve B of FIG. 2. Further, the point at which the various curves of FIG. 2 are relevant in FIG. 1 are so indicated by an encircled legend identifying the relevant curve. Thus, the encircled legend 2A at the output of message source 100 indicates that the signal of waveform 2A appears at the output of message source 100.

Referring now to FIG. 1, the message source 100 supplies a signal, such as a composite baseband television signal, to a compressor 102. The baseband television signal has a bandwidth $B_1$ and is designated as:

$$m(t) \qquad \text{Exp. (1)}$$

Curve 2A shows the power spectrum of such a signal.

The compressor 102 has a transfer characterisitic curve as shown in curve 2B and operates on the waveform $m(t)$ supplied from source 100 to produce a signal having the power spectrum of curve 2C which is designated as follows:

$$C[m(t)] \qquad \text{Exp. (2)}$$

After being processed for transmission in processing circuits 103 (including modulations circuits) the signal of curve 2C is transmitted through a transmission channel 104 of bandwidth $B_2$ to produce the signal r(t) received at the receiver which is designated as follows:

$$r(t) = L[C(mt)]$$ Exp. (3)

where L represents the filter effect of the transmission channel 104.

The output of transmission channel 104, after being processed to baseband by processing circuits 105, (which includes demodulation circuits), is also represented by curve 2C except that the frequency components $f_L$ in the shaded portion 200 are lost in the transmission channel 104 because these components fall beyond the bandwidth $B_2$ so that only the unshaded portion 202 is supplied to expander 106 (FIG. 1) at the receiver.

After expansion in expander 106 and filtering in filter 108 the received signal has a power spectrum characteristic as shown in curve 2D and designated as follows:

$$m_E(t)$$ Exp. (4)

It will be noted that the signal represented by curve 2D is not exactly the same as the transmitted signal m(t) because of the frequency components ($f_L$) lost in transmission and represented by the shaded portion 200 of curve 2C. It is this lost portion $f_L$ of the signal that the present invention recovers.

Generally speaking, the apparatus within the dotted block 130 of FIG. 1 functions to repeat the processing steps performed at the transmitter in order to re-create that signal portion corresponding, as a first order of approximation, to the shaded portion 200 of curve 2C and then add such re-created portion of the signal to the received signal represented by Expression 3 (the unshaded portion 202 of curve 2C).

The re-created first approximation of the lost signal portion 200 of curve 2C is accomplished by means of compressor 110, channel filter 112, and adder 114. Compressor 110 responds to the output $m_E(t)$ of filter 108 shown in curve 2D to produce the signal of curve 2E including both the shaded portion 208 and the unshaded portion 210 and represented by the following expression.

$$C[m_E(t)]$$ Exp. (5)

The signal of curve 2E is supplied to channel filter 112 which removes the shaded portion 208 (frequency components $f_c$) leaving only the unshaded portion 210 at the output of channel filter 112. The unshaded portion 210 is then supplied to the minus input of adder or subtractive combiner 114. The entire output of compressor 110, shown in curve 2E, is supplied to the positive input of adder 114 so that the output of adder 114 is only the shaded portion 208 comprising the $f_c$ components. Such shaded portion 208 is next supplied to one input of adder or combiner 116. The output of the transmission channel 104, which is the unshaded portion 202 of curve 2C is supplied to the other input of adder 116. The power spectrum output of adder 116, shown in curve 2F, is thus a composite signal with the unshaded portion 202a being derived from the unshaded portion 202 of curve 2C and the shaded portion 208a being derived from the shaded portion 208 of curve 2E.

Expander 120 responds to the output of adder 116 (curve 2F) to produce the expanded signal of curve 2G which has a cut off frequency approximately equal to $B_1$ and with only a small amount of high frequency components 212 extending beyond such cut off frequency $B_1$. The output of expander 120 is supplied to filter 122 of bandwidth $B_1$ to produce the signal of curve 2H which is a first approximation of the originally transmitted signal shown in curve 2A.

Further refinement of the signal can be obtained by processing it a second time through logic represented by block 124 which is the same as that within dotted block 130. If desired, higher orders of corrections can be obtained in a similar manner. It has been found, however that processing the signal twice to obtain the first and second order of correction is adequate for most purposes and recovers a high percentage (approximately 99%) of the signal lost in its transmission.

In FIG. 3, curve 220 represents the approximate time required to obtain a near 100% recovery of the lost portion of the signal using two or more iterations of the prior art method referred to hereinbefore. The curve 222 represents the approximate time required to obtain a high percentage (for example above 98%) of the lost portion of the signal using two or more iterations of the structure and method of the present invention. It can be seen that the time required by the present invention is much faster than that required of the prior art.

There are many circuits available in the prior art to implement the compressor 102 and the expander 106 of FIG. 1 which produce the non-linear transfer characteristics such as shown in curve 2B. Some of these circuits are described in U.S. Pat. No. 3,978,409 to Dolby et al. and entitled "Signal Compressors and Expanders", U.S. Pat. No. 4,200,889 to Strobele and entitled "Complementary Pre-Emphasis and De-Emphasis Circuits For a Video Signal Transfer Channel" and U.S. Pat. No. 4,191,968 to Kirk, Jr. and entitled "Video Signal Communications System With Improved Signal-to-Noise Ratio." The general theory of such companding transfer functions is described in pages 199–202 and page 273 of a publication entitled "Telecommunications and Computer", 2nd edition by James Martin and published in 1976 by Prentice-Hall, Inc.

What is claimed is:

1. In an analog communication system comprising a transmitter, a transmission path of bandwidth $B_2$, and a receiver, a method of recovering components of a signal m(t) of bandwidth $B_1$ which are cutoff in the transmission of such signal over said transmission path, where $B_2 \geq B_1$, and comprising the steps of:
   compressing the signal at the transmitter;
   transmitting the signal over said transmission path;
   demodulating the transmitted signal at the receiver to produce a signal r(t);
   expanding and filtering the signal r(t) to produce an initial reconstructed signal $m_E(t)$;
   compressing said signal $m_E(t)$ to produce a signal $C[m_E(t)]$ with frequency components $f_c$ extending above the frequency bandwidth $B_2$;
   filtering said signal $C[m_E(t)]$ through a filter of bandwidth $B_2$ to produce a signal $S_F$ corresponding to $C[m_E(t)]$ but with the frequency components $f_c$ extending above $B_2$ being cutoff;
   subtracting $S_F$ from $C[m_E(t)]$ to produce the frequency components $f_c$; and
   adding frequency components $f_c$ to r(t) to produce a first order of correction of the received signal r(t).

2. A receiver for receiving by way of a transmission path having a first bandwidth an analog message signal from a transmitter in which the said analog message signal is generated by amplitude compressing an analog source message having a second bandwidth according to a predetermined characteristic in such a fashion that said analog message signal as transmitted has a third bandwidth exceeding said first bandwidth, whereby said analog message signal received by said receiver has thereby suffered a loss of information, said receiver comprising:

receiver input terminals adapted for receiving said analog message signal;

expansion means coupled to said receiver input terminals for expanding said analog message signal according to a second characteristic which is the inverse of said predetermined characteristic to form a regenerated source message, subject to said loss of information;

compression means coupled to said expansion means for compressing said regenerated source message according to said predetermined characteristic for generating a first facsimile analog message signal which is an approximation of said analog message signal as transmitted;

transmission channel simulating filter means coupled to said compression means for filtering said first facsimile analog message signal with said first bandwidth to produce a second facsimile analog message signal representative of said analog message signal as received at said input terminals;

differencing means coupled to said compression means and to said transmission channel simulating filter means for taking the difference between said first and second facsimile analog message signals for generating a facsimile lost information signal;

summing means coupled to said differencing means and to said receiver input terminals for adding together said analog message signal and said facsimile lost information signal to form a corrected analog message signal; and second expansion means coupled to said summing means for expanding said corrected analog message signal according to said second characteristic for forming a corrected regenerated source message signal in which approximate correction has been made for said lost information.

3. In a communication system for transmitting a source signal m(t), said system comprising a transmitter, a transmission path of bandwidth $B_2$ and a receiver, in which the signal transmitted is compressed at baseband to produce signal $C(m(t))$ with the frequency components $f_L$ thereof extending beyond bandwidth $B_2$ being cutoff by said transmission path and in which the received baseband signal r(t) is expanded and filtered to produce a received signal $m_E(t)$ which is not a perfect replicar of said source signal m(t) because of said cutoff of signal components beyond the bandwidth $B_2$, a method of substantially recovering said cutoff signal components $f_L$ at the receiver comprising the steps of:

(a) compressing $m_E(t)$ to produce a signal $C(m_E(t))$ having frequency components $f_c$ lying above $B_2$, where $f_c \cong f_L$;

(b) filtering $C(m_E(t))$ to produce a signal $S_F$ equal to $C(m_E(t))$ less the frequency components $f_c$;

(c) subtracting $S_F$ from $C(m_E(t))$ to provide the components $f_c$;

(d) adding components $f_c$ to r(t) to produce a signal $C(m_1(t))$ which is a first order corrected approximation of $C(m(t))$; and (e) expanding and filtering $C(m_1(t))$ to produce a first order corrected approximation signal $m_1(t)$ of m(t).

4. A method as in claim 3 and further comprising the step of repeating steps (a) through (e) with the signal $m_1(t)$ to produce a signal $m_2(t)$ which is a second order corrected approximation of m(t).

5. In a communication system for transmitting a signal m(t) comprising a transmitter, a transmission path of bandwidth $B_2$, a receiver, a compressor at the transmitter for compressing said signal to produce a signal $C[m(t)]$ having signal components $f_L$ lying above bandwidth $B_2$, and an expander for expanding the received compressed signal r(t) at said receiver to produce an initial estimated signal $m_E(t)$ which is an initial estimate of m(t) but with the signal components $f_L$ having been cutoff during transmission, a system for generating a first order corrected approximation of said signal m(t), comprising:

means for compressing initial estimated signal $m_E(t)$ in the same manner as m(t) was compressed at the transmitter to produce a signal $C(m_E(t))$ with signal components $f_c$ lying above bandwidth $B_2$;

means for filtering $C(m_E(t))$ through a filter having similar filter characteristics L as said transmission path to produce the signal $(C(m_E(t))-f_c)$;

means for subtracting $(C(m_E(t))-f_c)$ from $C(m_E(t))$ to produce $f_c$;

means for adding signal components $f_c$ to said received compressed signal to produce reconstituted signal $(r(t)+f_c)$; and means for expanding and filtering said reconstituted signal $(r(t)+f_c)$ to produce a signal $m_1(t)$ which is a first order corrected approximation of said signal m(t).

* * * * *